United States Patent Office 3,025,178
Patented Mar. 13, 1962

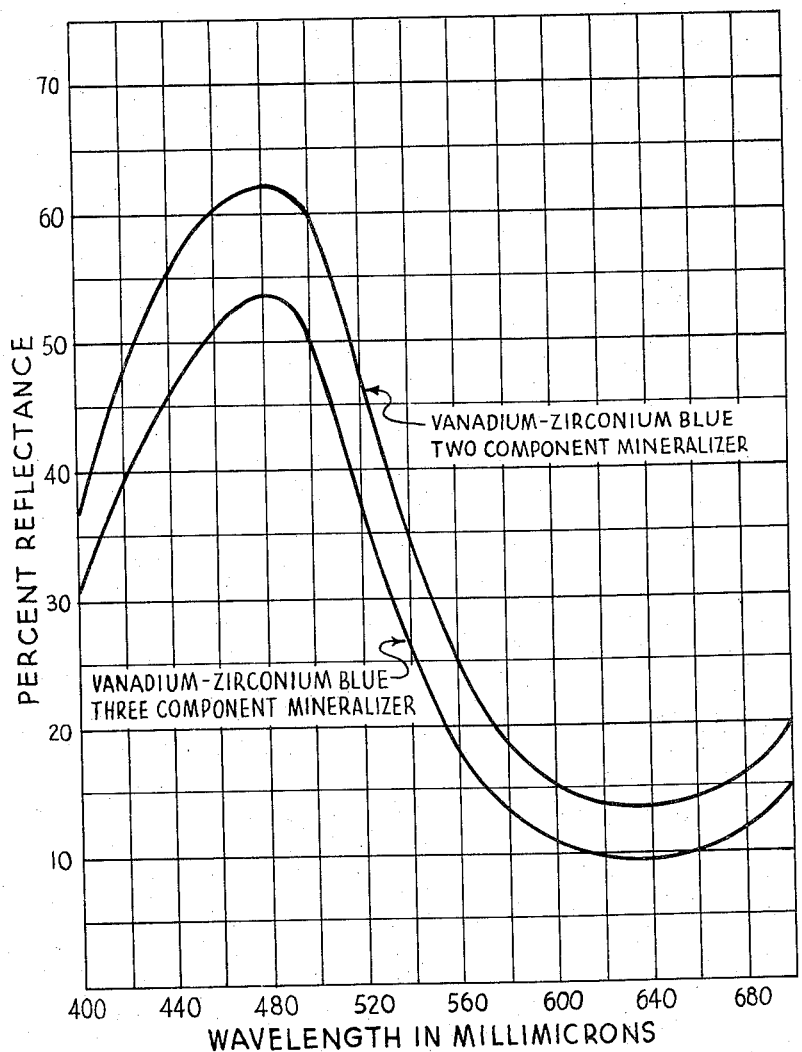

3,025,178
BLUE PIGMENTS
Clarence A. Seabright, Lakewood, Ohio, assignor to The Harshaw Chemical Company, Cleveland, Ohio, a corporation of Ohio
Filed Dec. 31, 1959, Ser. No. 863,140
8 Claims. (Cl. 106—299)

This invention relates to vanadia-zirconia-silica pigments commonly referred to as vanadium-zirconium blues and especially to methods of manufacturing such pigments and to the superior pigments resulting from the novel methods of manufacture.

My prior Patent No. 2,441,447, issued May 11, 1948, discloses a method of manufacture of vanadium-zirconium blue pigments, wherein a vanadium coloring agent is disposed in a $ZrO_2$—$SiO_2$ crystal lattice, having a pleasing blue color and suitable heat stability for use in ceramic glazes.

Pigments according to said patent have proved suitable. However, the strength of the pigments would be improved if increased amounts of vanadium coloring agent could be placed in the $ZrO_2$—$SiO_2$ crystal lattice. The entry of the coloring agent into the crystal lattice is primarily dependent on the mineralizer component employed in the pigment calcination mixture. Pigments produced according to U.S. Patent No. 2,441,447 employed a calcination mixture containing at least one compound capable of yielding $ZrO_2$, at least one compound capable of yielding $SiO_2$, at least one compound capable of yielding $V_2O_5$ and a mineralizer composition consisting of an alkali compound and preferably a fluoride compound. The patented mineralizer composition, while effective enough to open the crystal lattice to entry of some $V_2O_5$, does not function so as to react maximum amounts of the $V_2O_5$ coloring agent.

It is, therefore, an object of this invention to produce a vanadium-zirconium blue pigment of increased color strength.

It is a further object of this invention to produce a vanadium-zirconium blue pigment by employing a new and novel mineralizer composition.

I have now discovered that the addition of a three-component mineralizer composition consisting of a source of alkali metal ions, a source of fluoride ions and a source of halide ions selected from the group consisting of chlorine and bromine ions to a vanadium-zirconium blue calcination mixture will produce a blue ceramic pigment of enhanced color properties.

The novel process of this invention is carried out by calcining an intimate mixture of compounds of zirconium capable of yielding zirconium oxide, compounds of vanadium capable of yielding vanadium pentoxide, compounds of silicon capable of yielding silicon oxide, and a mineralizer composition consisting essentially of a source of alkali metal ions, a source of fluoride ions and a source of halide ions selected from the group consisting of chlorine and bromine ions. The calcination is carried out in a closed sagger, which provides calcination substantially out of contact with the air, at a temperature range of from 650° C. to 1000° C., the optimum range being from 750° C. to 900° C.

The vanadium compound capable of yielding vanadium pentoxide is present in the range of from 1% by weight to 12% by weight, expressed as $V_2O_5$ and may be a compound such as, for instance, ammonium metavanadate, vanadium pentoxide, or vanadyl chloride. The silicon compound capable of yielding silicon oxide is present in the range of from 10% by weight to 55% by weight, expressed as $SiO_2$, and may be silicon dioxide or silicic acid. The zirconium compound capable of yielding zirconium oxide is present in the range of from 35% by weight to 80% by weight, expressed as $ZrO_2$, and may be a compound such as, for instance, zirconium oxide, zirconium hydroxide, or zirconium carbonate. The mineralizer consists of a source of alkali metal ions, fluoride ions, and halide ions other than fluoride ions, wherein the source of alkali metal ions may be a compound such as, for instacne, sodium fluoride, sodium carbonate, potassium fluoride, sodium silicofluoride, etc. The source of fluoride ions may be a fluoride compound such as, for instance, sodium fluoride, potassium fluoride, zirconium oxyfluoride, and the source of halide ions may be a halide compound such as, for instance, vanadyl chloride, zirconium oxychloride, ammonium chloride, or sodium chloride.

The mineralizer composition appears to have the ability to open the crystal lattice of the color fixing agent, thereby allowing the entry of increased amounts of vanadium coloring agent. The entry of increased amounts of coloring agent results in a fixation of greater amounts of vanadium which consequently produces blue colors of a strength superior to any obtained from calcination mixtures of the prior art having identical amounts of vanadium therein. It should be understood that the mineralizer composition of this invention requires the presence of three critical ions and that these critical ions may be derived from the calcination mixture compounds of zirconium and the calcination mixture compounds of vanadium or may be derived from compounds specially placed in the calcination mixture as a source of critical ion or ions. The mineralizer composition must be present in the calcination mixture in amounts such that from 0.25% by weight to 8% by weight of alkali metal ions are present, from 0.25% by weight to 5% by weight of fluoride ions are present, and from 0.25% by weight to 8% by weight of halide ions other than fluoride ions are present.

The ability of the three component mineralizer composition to fix increased amounts of vanadium pentoxide coloring agent is demonstrated by means of the following table designated as Table I.

TABLE I

| Calcination Mixture | Mineralizer | Initial $V_2O_5$, percent | Retained $V_2O_5$, percent |
| --- | --- | --- | --- |
| A | Two component | 4.8 | 1.12 |
| B | 2% $NH_4Cl$+two component | 4.8 | 1.73 |
| C | 4% $NH_4Cl$+two component | 4.8 | 1.74 |
| D | 8% $ZrOCl_2 8HO_2$+two component | 4.8 | 1.60 |
| E | two component | 6.0 | 1.32 |
| F | 2% $NH_4Cl$+two component | 6.0 | 1.84 |
| G | 4% $NH_4Cl$+two component | 7.1 | 1.98 |

The $V_2O_5$ retention results were obtained from calcination mixtures prepared according to this invention and according to the method prescribed in the prior art. The prior art calcination mixtures are mixtures wherein the mineralizer is a two component mineralizer consisting of an alkali compound and a fluoride compound. The calcination mixtures of this invention are mixtures containing the two component mineralizer plus a source of halide ion selected from the group consisting of chlorine and bromine ions. It has been found that vanadium pentoxide which has not entered the crystal lattice of the $ZrO_2$—$SiO_2$ may be removed by treating the calcined blue pigment with a solvent for $V_2O_5$ and washing to remove soluble vanadium. This does not impair the qualities of the blue pigment. The $V_2O_5$ retained after treatment as shown in Table I is then an indication of the strength of the various calcination mixtures. It appears that the ability of the mineralizer composition to fix increased amounts of vanadium pentoxide will vary according to the grade of zirconium oxide employed. Apparently zirconium oxides containing large amounts of impurities and especially zircon impurities do not respond to the novel mineralizer composition of this invention in the same degree as pure zirconium oxide.

The following specific procedures are given for purposes of illustration of the preparation of the novel vanadium-zirconium blue pigment of this invention and are not considered to limit the spirit or scope of the invention.

*Example I*

6 grams of vanadium pentoxide, 2 grams of ammonium chloride, 5 grams of sodium fluoride, 31 grams of silica and 63 grams of zirconium oxide were hammer milled through a fine screen. The hammer milled mixture was then calcined in a covered sagger at about 835° C. The calcined mixture was again hammer milled and the resulting product was a strong blue ceramic pigment.

*Example II*

60 grams of zirconium oxide, 31 grams of silica, 6 grams of vanadium pentoxide, 5 grams of sodium fluoride, 8 grams of zirconium oxychloride were hammer milled through a fine screen. The hammer milled mixture was calcined at a temperature of 835° C. in a covered sagger. The calcined mixture was again hammer milled and the resulting product was a strong blue ceramic pigment.

*Example III*

63 grams of zirconium oxide, 31 grams of silica, 6 grams of vanadium pentoxide, 5 grams of sodium fluoride, and 4 grams of sodium chloride were hammer milled through a fine screen. The hammer milled mixture was then calcined in a covered sagger at about 835° C. The calcined mixture was again pulverized through a hammer mill and the resulting product was a strong blue ceramic pigment.

The advantages of the novel pigment of this invention will be more readily apparent from the description of the drawing which follows:

The drawing is a color comparison in a form of plotted curves which compares the vanadium-zirconium blue pigment of this invention with the vanadium-zirconium blue pigment of the prior art. The curves were produced by a Hardy recording spectrophotometer from samples containing 10% pigment in a typical Cone 5 tile glaze on a white ceramic tile body.

The FIGURE is a graphic representation of the color of two blue ceramic tiles, plotting percentage reflectance against wave-length in millimicrons. The upper curve designates the vanadium-zirconium blue pigment of the prior art. The lower curve designates the novel vanadium-zirconium blue pigment of this invention. It should be noted that the three component mineralizer curve, which is representative of the novel pigment of this invention, exhibits a percent reflectance which is lower at all wave-lengths than the corresponding two component mineralizer curve which is representative of the blue pigment of the prior art. The lower of these color curves is indicative of the stronger color, that is, is indicative of a color which has a higher tinctorial strength.

The following table, designated as Table II, discloses the compositions used to produce the curves shown in the FIGURE and also additional preferred compositions of this invention:

TABLE II

|  | A | B | C | D | E | F | G |
|---|---|---|---|---|---|---|---|
| Zirconium Oxide | 63 | 63 | 60 | 63 | 63 | 63 | 63 |
| Silica | 31 | 31 | 31 | 31 | 31 | 31 | 31 |
| Vanadium Pentoxide, Tech | 6 | 6 | 6 | 8.3 | 6 | 6 | ----- |
| Ammonium Vanadate | ----- | ----- | ----- | ----- | ----- | ----- | 6 |
| Sodium Fluoride | 5 | 5 | 5 | 6.7 | 5 | 5 | 5 |
| Ammonium Chloride | ----- | 2 | ----- | 2 | ----- | ----- | 2 |
| Zirconium Oxychloride | ----- | ----- | 8 | ----- | ----- | ----- | ----- |
| Sodium Chloride | ----- | ----- | ----- | ----- | 4 | ----- | ----- |
| Sodium Bromide | ----- | ----- | ----- | ----- | ----- | 3 | ----- |
| Calcination Temperature, ° C | 835 | 835 | 835 | 835 | 835 | 835 | 835 |
| Color | (1) | (2) | (2) | (2) | (2) | (2) | (2) |

[1] Blue.
[2] Deep blue.

The compositions of the table which are designated as "A" and "B" are represented by a corresponding color curve in the FIGURE. Composition "A" corresponds to the upper curve and discloses zirconium dioxide, silicon dioxide, vanadium pigment of the prior art, which merely contains a two component mineralizer lacking in a halide selected from the group of bromine and chlorine. Composition "B" corresponds to the lower curve which is representative of the novel pigment of this invention. Composition "B" discloses a calcination mixture which contains the novel three component mineralizer composition of this invention, that is, a mineralizer composition which contains a source of alkali ions, a source of fluoride ions, and a source of halide ions selected from the group consisting of bromine and chlorine ions.

Having thus disclosed my invention, what I claim is:

1. A method of preparing a blue ceramic pigment comprising calcining substantially out of contact with air a mixture of compounds including from 35% by weight to 80% by weight expressed as $ZrO_2$ of at least one compound capable of yielding zirconium oxide, from 1% by weight to 12% by weight expressed as $V_2O_5$ of at least one compound capable of yielding vanadium pentoxide, from 10% by weight to 55% by weight expressed as $SiO_2$ of at least one compound capable of yielding silicon oxide, a source of alkali metal ions present in amounts such that there is 0.25% by weight to 8% by weight of alkali metal ions present in the calcination mixture, a source of fluoride ions present in the amounts such that there is 0.25% by weight to 5% by weight of fluoride ions present in the calcination mixture, of a source of halide ions selected from the group consisting of chloride and bromide ions present in amounts such that there is 0.25% by weight to 8% by weight of halide ions other than fluoride ions present in the calcination mixture at a calcination temperature of from 650° C. to 1000° C.

2. The method of claim 1 wherein the source of halide ions selected from the group consisting of chloride and bromide ions is obtained from compounds capable of yielding zirconium oxide and compounds capable of yielding vanadium pentoxide.

3. A method of preparing a blue ceramic pigment comprising calcining substantially out of contact with air a mixture consisting of about 63 parts of zirconium oxide, about 31 parts of silica, about 6 parts of vanadium pentoxide, sodium fluoride, and ammonium chloride at a calcination temperature of from 650° C. to 1000° C., said sodium fluoride and ammonium chloride being present in the calcination mixture in quantities such that from 0.25% by weight to 8% by weight alkali metal ions are present, from 0.25% by weight to 5% by weight fluoride ions are present, and from 0.25% by weight to 8% by weight of chloride ions are present.

4. The method of claim 3 wherein the calcination temperature is 835° C.

5. The method of claim 1 wherein the calcination temperature is 750° C. to 900° C.

6. A method of preparing a blue ceramic pigment comprising admixing from 35% by weight to 80% by weight expressed as $ZrO_2$ of at least one compound capable of yielding zirconium oxide, from 1% by weight to 12% by weight expressed as $V_2O_5$ of at least one compound capable of yielding vanadium pentoxide, from 10% by weight to 55% by weight expressed as $SiO_2$ of at least one compound capable of yielding silicon oxide, 0.25% by weight to 8% by weight of a source of alkali metal ions, from 0.25% by weight to 5% by weight of a source of fluoride ions, and from 0.25% by weight to 8% by weight of a source of halide ions selected from the group consisting of chloride and bromide ions, calcining the mixture substantially out of contact with air at a temperature of 650° to 1000° C., treating the calcined mixture with vanadium pentoxide solvent and then removing the solubilized vanadium.

7. The method of claim 6 wherein the calcination temperature is from 750° C. to 900° C.

8. The method of claim 6 wherein the source of halide ions selected from the group consisting of bromide and chloride ions is obtained from material capable of yielding zirconium oxide and material capable of yielding vanadium pentoxide.

References Cited in the file of this patent
UNITED STATES PATENTS

| | | |
|---|---|---|
| 2,441,447 | Seabright | May 11, 1948 |
| 2,847,317 | Carnahan | Aug. 12, 1958 |
| 2,871,138 | Linnell | Jan. 27, 1959 |